United States Patent
Peng et al.

(10) Patent No.: US 11,469,873 B2
(45) Date of Patent: Oct. 11, 2022

(54) METHOD, APPARATUS AND SYSTEM FOR ACK/NACK REPORTING

(71) Applicant: Alcatel Lucent, Nozay (FR)

(72) Inventors: Xi Peng, Shanghai (CN); Qing Cao, Shanghai (CN); Huiping Zheng, Shanghai (CN)

(73) Assignee: Alcatel Lucent, Nozay (FR)

( * ) Notice: Subject to any disclaimer, the term of this patent is extended or adjusted under 35 U.S.C. 154(b) by 554 days.

(21) Appl. No.: 16/470,459

(22) PCT Filed: Dec. 15, 2017

(86) PCT No.: PCT/IB2017/001665
§ 371 (c)(1),
(2) Date: Feb. 5, 2020

(87) PCT Pub. No.: WO2018/109557
PCT Pub. Date: Jun. 21, 2018

(65) Prior Publication Data
US 2020/0213061 A1    Jul. 2, 2020

(30) Foreign Application Priority Data

Dec. 16, 2016  (CN) .......................... 201611169471.0

(51) Int. Cl.
*H04L 5/00*  (2006.01)
*H04W 4/70*  (2018.01)
(Continued)

(52) U.S. Cl.
CPC .......... *H04L 5/0055* (2013.01); *H04L 1/1812* (2013.01); *H04L 5/0007* (2013.01); *H04W 4/70* (2018.02); *H04W 28/04* (2013.01)

(58) Field of Classification Search
CPC ... H04L 5/0055; H04L 1/1812; H04L 5/0007; H04L 1/1861; H04L 1/1607; H04W 4/70; H04W 28/04
See application file for complete search history.

(56) References Cited

U.S. PATENT DOCUMENTS 9,319,211 B2 *  4/2016  Larsson ............... H04L 1/1861
2012/0140698 A1  6/2012  Noh et al.
(Continued)

FOREIGN PATENT DOCUMENTS

CN   102377520   2/2015
CN   102237985   12/2015
(Continued)

OTHER PUBLICATIONS

International Search Report for PCT/IB2017/001665 dated Apr. 5, 2018.

*Primary Examiner* — Hoang-Chuong Q Vu
(74) *Attorney, Agent, or Firm* — Fay Sharpe LLP

(57) ABSTRACT

The objective of the present disclosure is to provide a method, apparatus and system of ACK/NACK reporting for Cat-M mechanism. Here, a user equipment feeds back an ACK/NACK message to an eNB on PUSCH based on received downlink data, wherein when computing the number of resource elements occupied by the ACK/NACK message on PUSCH, the number of OFDM symbols in a guard period is ruled out. This may effectively lower the UE's PUSCH data code rate, and meanwhile enhance the eNB's decoding performance on PUSCH.

13 Claims, 2 Drawing Sheets

(51) Int. Cl.
*H04W 28/04* (2009.01)
*H04L 1/18* (2006.01)

(56) References Cited

U.S. PATENT DOCUMENTS

| | | | |
|---|---|---|---|
| 2013/0044721 A1* | 2/2013 | Yang | H04L 5/0053 |
| | | | 370/329 |
| 2015/0049676 A1* | 2/2015 | Tiirola | H04L 5/001 |
| | | | 370/329 |
| 2017/0111160 A1* | 4/2017 | Chen | H04W 72/042 |
| 2017/0272224 A1* | 9/2017 | Ang | H04L 1/1887 |
| 2017/0325258 A1* | 11/2017 | Nogami | H04L 1/0068 |
| 2017/0367046 A1* | 12/2017 | Papasakellariou | H04L 5/0048 |
| 2018/0069750 A1* | 3/2018 | Yoo | H04L 5/0048 |
| 2019/0159178 A1* | 5/2019 | Tang | H04L 27/2613 |
| 2019/0260521 A1* | 8/2019 | Luo | H04W 72/042 |
| 2019/0313406 A1* | 10/2019 | Liu | H04W 72/04 |

FOREIGN PATENT DOCUMENTS

| | | |
|---|---|---|
| EP | 2 421 188 A2 | 2/2012 |
| EP | 2 490 362 A1 | 8/2012 |
| EP | 3 557 800 A1 | 10/2019 |

\* cited by examiner

METHOD, APPARATUS AND SYSTEM FOR ACK/NACK REPORTING

FIELD

The present disclosure generally relates to the field of mobile communications, and more particularly, to a technology of ACK/NACK reporting for Cat-M mechanism.

BACKGROUND

To ease Internet of Things (IoT) devices data transmission via LTE network, Cat-M is introduced in 3GPP LTE Release 13. The target for Cat-M UE is low complexity and low power consumption. Cat-M UE is only used for narrow band, namely maximum 6 Resource Blocks (RB) could be occupied for Cat-M DL and UL physical channels. For UL, a guard period is created for Tx-to-Tx frequency retuning between two consecutive subframes. It is counted as one or multiple OFDM symbols. These OFDM symbols could not be used for PUSCH data transmission.

However, when the ACK/NACK message is multiplexed via PUSCH, the effect on code rate by these OFDM symbols in guard period is not considered when calculating the number of resource elements (REs) occupied by this ACK/NACK. If more REs are occupied by the ACK/NACK transmission, the PUSCH data code rate will be higher than expected. In a low SINR (Signal To Interference Plus Noise Ratio) environment, decoding of the PUSCH data will fail. For a CEModeA (Coverage Enhancement Mode A) UE, the situation will be even worse.

To this end, the prior art has two solutions:

1) lower down $\beta_{offset}^{HARQ-ACK}$ to reduce the REs occupied by ACK/NACK on the PUSCH. This is effective when the PUSCH frequency retuning actually occurs. However, the number of ACK/NACK REs for normal situations is also reduced, which then lowers the ACK/NACK decoding performance in normal situations.

2) lower PUSCH MCS (Modulation Coding Scheme) through BLER (Block Error Ratio) control. After experiencing multiple PUSCH data HARQ (Hybrid Automatic Repeat Request) failures by lowering the scheduling UL grant MCS, this solution will be valid. However, this solution has two drawbacks. Firstly, the transmission blocks are smaller than normal cases; secondly, a plurality of RBs are wasted before BLER control becomes valid.

SUMMARY

The object of the present disclosure is to provide a method, apparatus and system of ACK/NACK reporting for Cat-M mechanism.

According to one aspect of the present disclosure, there is provided a method for ACK/NACK reporting of Cat-M mechanism, comprising steps of:

feeding back, by a user equipment, an ACK/NACK message to an eNB on PUSCH based on received downlink data, wherein when computing the number of resource elements occupied by the ACK/NACK message on PUSCH, the number of OFDM symbols in a guard period is ruled out.

According to another aspect of the present disclosure, there is provided a user equipment for ACK/NACK reporting of Cat-M mechanism, wherein the user equipment comprises:

a reporting apparatus for feeding back an ACK/NACK message to an eNB on PUSCH based on received downlink data, wherein when computing the number of resource elements occupied by the ACK/NACK message on PUSCH, the number of OFDM symbols in a guard period is ruled out.

According to another aspect of the present disclosure, there is provided an eNB for ACK/NACK reporting of Cat-M mechanism, wherein the eNB comprises:

a receiving apparatus for receiving, on PUSCH, an ACK/NACK message fed back by a user equipment, the ACK/NACK message corresponding to the downlink data previously transmitted by the eNB to the user equipment, wherein when computing the number of resource elements occupied by the ACK/NACK message on PUSCH, the number of OFDM symbols in a guard period is ruled out.

According to yet another aspect of the present disclosure, there is provided a system for ACK/NACK reporting of Cat-M mechanism, wherein the system comprises a user equipment and an eNB, wherein the user equipment comprises:

a reporting apparatus for feeding back an ACK/NACK message to the eNB on PUSCH based on received downlink data, wherein the eNB comprises:

a receiving apparatus for receiving, on PUSCH, the ACK/NACK message fed back by the user equipment, the ACK/NACK message corresponding to the downlink data previously transmitted by the eNB to the user equipment, wherein when computing the number of resource elements occupied by the ACK/NACK message on PUSCH, the number of OFDM symbols in a guard period is ruled out.

Compared with the prior art, the present disclosure provides a novel solution of computing the number of REs occupied by ACK/NACK on PUSCH. For CEModeA UE, the present disclosure rule outs the number of OFDM symbols of the guard period from calculation of the number of ACK/NACK Res, i.e., Q-prime. This may effectively lower the UE's PUSCH data code rate, and meanwhile enhance the eNB's decoding performance on PUSCH.

BRIEF DESCRIPTION OF THE DRAWINGS

Other features, objectives and advantages of the present disclosure will become more apparent through reading the detailed depiction of the non-limiting embodiments with reference to the accompanying drawings.

In the accompanied drawings, same or like reference numerals represent same or similar components.

DETAILED DESCRIPTION OF EMBODIMENTS

Figure 1:
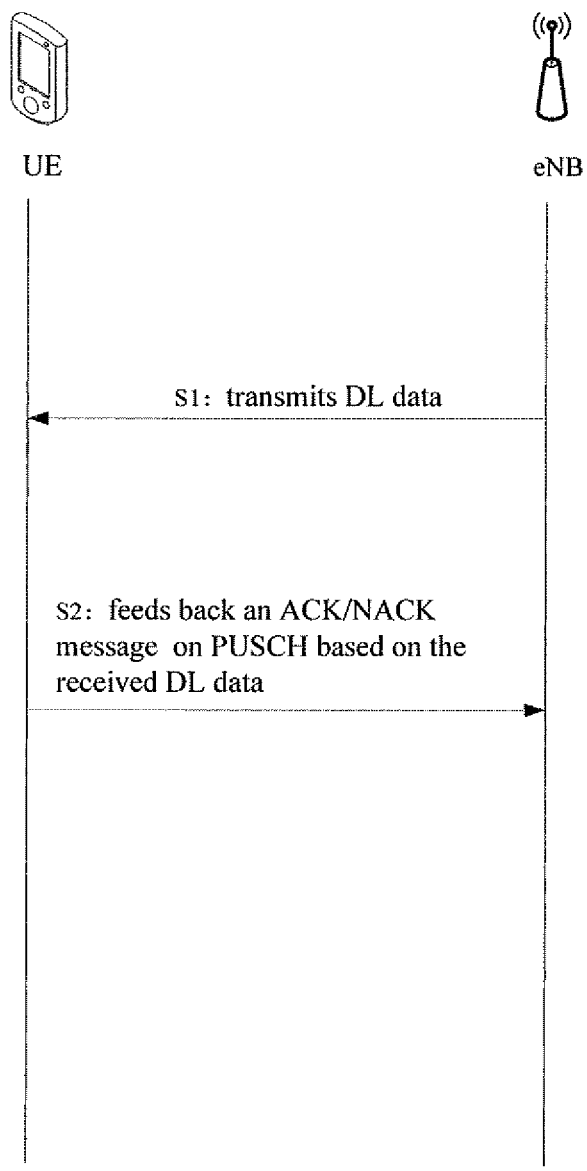
FIG. 1 shows a flow diagram of a method of ACK/NACK reporting for Cat-M mechanism according to an embodiment of the present disclosure.

Before discussing the exemplary embodiments in more details, it should be noted that some exemplary embodiments are described as processes or methods depicted as flow diagrams. Although the flow diagrams describe various operations as sequential processing, many operations therein may be implemented in parallel, concurrently or simultaneously. Besides, the sequence of various operations may be re-arranged. When the operations are completed, the processing may be terminated; besides, there may also include additional steps that are not included in the drawings. The processing may correspond to a method, a function, a specification, a sub-routine, a sub-program, etc.

The methods that will be discussed infra (some of which will be illustrated through flow diagrams) may be implemented through hardware, software, firmware, middleware, microcode, hardware descriptive language or any combination thereof. When they are implemented using software, firmware, middleware or microcode, the program codes or code segments for implementing essential tasks may be stored in a computer or computer readable medium (e.g., storage medium). (One or more) processors may implement essential tasks.

The specific structures and functional details disclosed here are only representative and intended to describe the exemplary embodiments of the present disclosure. Further, the present disclosure may be specifically implemented by a plurality of alternative modes and should not be construed to being only limited to the embodiments illustrated herein.

It should be understood that although terms like "first" and "second" may be used here to describe respective units, these units should not be limited by these terms. Use of these terms are only for distinguishing one unit from another unit. For example, without departing from the scope of exemplary embodiments, a first unit may be referred to as a second unit, and likewise the second unit may be referred to as the first unit. The term "and/or" used here includes any and all combinations of one or more associated items as listed.

It should be understood that when one unit is "connected" or "coupled" to a further unit, it may be directly connected or coupled to the further unit, or an intermediate unit may exist. In contrast, when a unit is "directly connected" or "directly coupled" to a further unit, an intermediate unit does not exist. Other terms (e.g., "disposed between" VS. "directly disposed between," "adjacent to" VS. "immediately adjacent to," and the like) for describing a relationship between units should be interpreted in a similar manner.

The term used here is only for describing preferred embodiments, not intended to limit the exemplary embodiments. Unless otherwise indicated, a singular form "a(n)" or "one" used here is also intended to cover plurality. It should also be understood that the terms "comprise" and/or "include" as used here limit the presence of features, integers, steps, operations, units and/or components as stated, but do not exclude presence or addition of one or more other features, integers, steps, operations, units, components and/or combinations.

It should also be mentioned that in some alternative implementations, the functions/actions as mentioned may occur according to the sequences different from what are indicated in the drawings. For example, dependent on the functions/actions as involved, two successively indicated diagrams actually may be executed substantially simultaneously or sometimes may be executed in a reverse order.

Hereinafter, the present disclosure will be described in further detail with reference to the accompanying drawings.

FIG. 1 shows a flow diagram of a method according to an embodiment of the present disclosure, which specifically shows an ACK/NACK reporting process in the Cat-M mechanism.

As shown in FIG. 1, in step S1, an eNB transmits downlink data to a UE; in step S2, the UE feeds back an ACK/NACK message to the eNB on PUSCH based on the received downlink data.

Particularly, the ACK/NACK message fed back by the UE is not limited to a feedback to one piece of DL data, but also may be a feedback to multiple pieces of DL data as received.

Therefore, in the case of feedback for only one piece of DL data, the bit number of ACK/NACK is 1; in the case of feedback for a plurality of pieces of DL data, each piece of DL data corresponds to a 1-bit ACK/NACK.

When the UE successfully decodes the DL data, it returns ACK; when the decoding fails, returns NACK. UE may regularly/periodically feed back the ACK/NACK message to the eNB.

For the number of REs (Q-Prime) occupied by the ACK/NACK on PUSCH may be calculated with equation (1) below according to 3GPP 36.212 section 5.2.2.6.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right) \quad (1)$$

Where,

O represents the number of bits of ACK/NACK;

$M_{sc}^{PUSCH-initial}$ represents a scheduling bandwidth of an initial PUSCH transmission subframe in a transmission block, denoted as the number of subcarriers;

$N_{symb}^{PUSCH-initial}$ represents the number of SC-FDMA (Single-carrier Frequency-Division Multiple Access) symbols carrying PUSCH data in the initial PUSCH transmission subframe in the transmission block, calculated by $N_{symb}^{PUSCH-initial}=(2\cdot)(N_{symb}^{UL}-1)-N_{SRS}$, where $N_{symb}^{UL}$ represents the number of SC-FDMA symbols in each timeslot, i.e., 7; $N_{SRS}$ represents the number of SRS (Sounding Reference Signal) SC-FDMA symbols reserved in the current subframe;

$\beta_{offset}^{PUSCH}$, also denoted as $\beta_{offset}^{HARQ-ACK}$, represents a value of ACK/NACK offset β, configured by a higher layer;

$K_r$ represents a code block size of the PUSCH transmission block;

C represents the number of code blocks of the PUSCH transmission block; and $M_{sc}^{PUSCH}$ represents a scheduled bandwidth in the current PUSCH transmission subframe for the transmission block, denoted as the number of subcarriers.

It may be seen from the above equation (1) that the existing Q-prime algorithm does not rule out the OFDM symbols occupied by the UL guard period. For the UE side, it causes a relatively high PUSCH data code rate; for the eNB side, it deteriorates the PUSCH decoding performance.

Therefore, the present disclosure provides a novel solution of computing the number of REs occupied by ACK/NACK on PUSCH. For the CEModeA UE, the present disclosure takes the number of OFDM symbols of the guard period into consideration for computing the number of ACK/NACK Res, i.e., Q-prime.

Specifically, because the number of OFDM symbols in the guard period will affect $N_{symb}^{PUSCH-initial}$ in the equation (1), the present disclosure redefines $N_{symb}^{PUSCH-initial}$ for the CEModeA UE, thereby ruling out the OFDM symbols not used for PUSCH data transmission.

Here, $N_{symb}^{PUSCH-initial}$ is redefined below:

$$N_{symb}^{PUSCH-initial}=(2\cdot(N_{symb}^{UL}-1)-N_{SRS}-N_{start}^{PUSCH}-N_{end}^{PUSCH}) \quad (2)$$

where $N_{start}^{PUSCH}$ is the serial number of an initial OFDM symbol for PUSCH transmission, $N_{end}^{PUSCH}$ is a minimum value between 0 and a difference, the difference being a difference between the number of OFDM symbols punctured off the end of the current subframe and the number of SRS OFDM symbols.

Alternatively, $N_{symb}^{PUSCH\text{-}initial}$ may be redefined as follows:

$$N_{symb}^{PUSCH\text{-}initial}=(2\cdot(N_{symb}^{UL}-1)-N_{Muted}) \quad (3)$$

where $N_{Muted}$ is the number of OFDM symbols not used for PUSCH transmission, which is caused by SRS puncturing or PUSCH frequency retuning.

Hereinafter, the number of REs occupied by the ACK/NACK on PUSCH that are computed according to the equation (1) and the equation (2) with redefined $N_{symb}^{PUSCH\text{-}initial}$, and the PUSCH data code rates determined therefrom are compared.

Suppose: number of RB=1, MCS=2, the bit number of ACK/NACK=1, beta_offset_index=9, $N_{SRS}$=0, and the retuned OFSM symbols are the first symbol and the last symbol.

Accordingly, O=1, $M_{sc}^{PUSCH\text{-}initial}$=1*12=12;

According to beta_offset_index=9, for example, table 8.6.3-1 of 3GPP 36.213 D30 may be looked up to obtain $\beta_{offset}^{PUSCH}$=15.875;

By querying table 7.1.7.2.1-1 of 3GPP 36.213 D30 and adding 24-bit CRC check bits to the queried results, $$\sum_{r=0}^{C-1} K_r = 56$$

is derived.

According to $N_{symb}^{PUSCH\text{-}initial}=(2\cdot(N_{symb}^{UL}-1)-N_{SRS})=(2*(7-1)-0)=12$ in equation (1), it is derived that $$Q' = \min\left(\left\lceil\frac{O\cdot M_{sc}^{PUSCH\text{-}initial}\cdot N_{symb}^{PUSCH\text{-}initial}\cdot \beta_{offset}^{PUSCH}}{\sum_{r=0}^{C-1} K_r}\right\rceil, 4\cdot M_{sc}^{PUSCH}\right)$$

$$= \min\left(\text{Ceiling}\left\lceil\frac{1*12*12*150875}{56}\right\rceil, 4*12\right)$$

$$= \min(41, 48)$$

$$= 41$$

Therefore, the PUSCH data code rate=56/(2*(12*10−41))= 0.35.

However, according to $N_{symb}^{PUSCH\text{-}initial}=(2\cdot(N_{symb}^{UL}-1)-N_{SRS}-N_{start}^{PUSCH}-N_{end}^{PUSCH})=2*(7-1)-0-1-(2-1))=10$ in equation (2), it is derived that $$Q' = \min\left(\left\lceil\frac{O\cdot M_{sc}^{PUSCH\text{-}initial}\cdot N_{symb}^{PUSCH\text{-}initial}\cdot \beta_{offset}^{PUSCH}}{\sum_{r=0}^{C-1} K_r}\right\rceil, 4\cdot M_{sc}^{PUSCH}\right)$$

$$= \min\left(\text{Ceiling}\left\lceil\frac{1*12*10*150875}{56}\right\rceil, 4*12\right)$$

$$= \min(35, 48)$$

$$= 35$$

Therefore, the PUSCH data code rate=56/(2*(12*10−35))=0.32.

In addition, it may be likewise derived according to equation (3) that $N_{symb}^{PUSCH\text{-}initial}=(2*(7-1)-2)=10$, such that Q-prime=35, and PUSCH data code rate=0.32.

Based on the comparison above, it may be seen that the method of computing the number of REs (Q-prime) occupied by ACK/NACK on PUSCH according to the present disclosure may effectively reduce the PUSCH data code rate of the UE and meanwhile improve the eNB's decoding performance on PUSCH.

Figure 2:
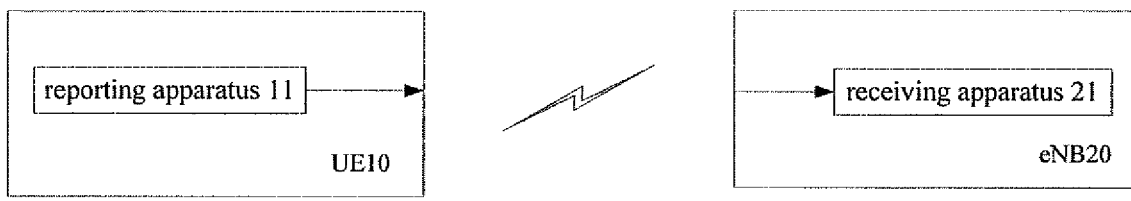
FIG. 2 shows a schematic diagram of a system of ACK/NACK reporting for Cat-M mechanism according to an embodiment of the present disclosure.

FIG. 2 shows a schematic diagram of a system according to one embodiment of the present disclosure, specifically showing apparatuses respectively in a UE and an eNB that participate in ACK/NACK reporting for the Cat-M mechanism.

As shown in FIG. 2, a reporting apparatus 11 is arranged in UE10, and a receiving apparatus 21 is arranged in eNB20.

Specifically, the reporting apparatus 11 feeds back an ACK/NACK message to the eNB on PUSCH based on the received downlink data; correspondingly, the receiving apparatus 21 receives the ACK/NACK message on PUSCH as fed back by the UE, the ACK/NACK message corresponding to the downlink data transmitted by the eNB to the UE previously.

Particularly, the ACK/NACK message fed back by the reporting apparatus 11 in UE is not limited to a feedback to one piece of DL data, but also may be a feedback to multiple pieces of DL data as received. Therefore, in the case of feedback for only one piece of DL data, the bit number of ACK/NACK is 1; in the case of feedback for a plurality of pieces of DL data, each piece of DL data corresponds to a 1-bit ACK/NACK.

When the UE successfully decodes the DL data, the reporting apparatus 11 returns ACK; when the decoding fails, the reporting apparatus 11 returns NACK. The reporting apparatus 11 may regularly/periodically feed back the ACK/NACK message to the eNB.

For the number of REs (Q-Prime) occupied by the ACK/NACK on PUSCH may be calculated with the above equation (1) according to 3GPP 36.212 section 5.2.2.6.

It may be seen from the above equation (1) that the existing Q-prime algorithm does not rule out the OFDM symbols occupied by the UL guard period. For the UE side, it causes a relatively high PUSCH data code rate; for the eNB side, it deteriorates the PUSCH decoding performance.

Therefore, the present disclosure provides a novel solution of computing the number of REs occupied by ACK/NACK on PUSCH. For the CEModeA UE, the present disclosure takes the number of OFDM symbols of the guard period into consideration for computing the number of ACK/NACK Res, i.e., Q-prime.

Specifically, because the number of OFDM symbols in the guard period will affect $N_{symb}^{PUSCH\text{-}initial}$ in the equation (1), the present disclosure redefines $N_{symb}^{PUSCH\text{-}initial}$ for the CEModeA UE, thereby ruling out the OFDM symbols not used for PUSCH data transmission.

Here, $N_{symb}^{PUSCH\text{-}initial}$ is redefined according to the above equation (2).

Alternatively, $N_{symb}^{PUSCH\text{-}initial}$ may be redefined according to the above equation (3).

The method of computing the number of REs (Q-prime) occupied by ACK/NACK on PUSCH according to the present disclosure may effectively reduce the PUSCH data code rate of the UE and meanwhile improve the eNB's decoding performance on PUSCH.

We claim:

1. A method for ACKnowledgement/Negative ACKnowledgement (ACK/NACK) reporting of Cat-M mechanism, comprising:

feeding back, by a user equipment, an ACK/NACK message to an evolved Node B (eNB) on Physical Uplink Shared CHannel (PUSCH) based on received downlink data, wherein when computing the number of resource elements occupied by the ACK/NACK message on PUSCH, the number of Orthogonal Frequency Division Multiplexing (OFDM) symbols in a guard period is ruled out.

2. The method according to claim 1, wherein when computing the number of Single Carrier Frequency Division Multiple Access (SC-FDMA) symbols that carry PUSCH data in an initial PUSCH transmission subframe, the number of OFDM symbols in the guard period is ruled out.

3. The method according to claim 2, wherein the number of SC-FDMA symbols that carry the PUSCH data in the initial PUSCH transmission subframe is denoted as $N_{symb}^{PUSCH\text{-}initial}$, wherein the ruling out the number of OFDM symbols in the guard period specifically comprises:
when calculating $N_{symb}^{PUSCH\text{-}initial}$, further subtracting the number of OFDM symbols in the guard period.

4. The method according to claim 2, wherein the number of SC-FDMA symbols that carry the PUSCH data in the initial PUSCH transmission subframe is denoted as $N_{symb}^{PUSCH\text{-}initial}$, $$N_{symb}^{PUSCH\text{-}initial} = (2 \cdot (N_{symb}^{UL} - 1) - N_{SRS} - N_{start}^{PUSCH} - N_{end}^{PUSCH}),$$

where $N_{symb}^{UL}$ is the number of SC-FDMA symbols in each timeslot,
$N_{SRS}$ is the number of Sounding Reference Signals (SRS) SC-FDMA symbols reserved in the current subframe,
$N_{start}^{PUSCH}$ is the serial number of an initial OFDM symbol for PUSCH transmission, and
$N_{end}^{PUSCH}$ is a minimum value between 0 and a difference, the difference being a difference between the number of OFDM symbols punctured off the end of the current subframe and the number of SRS OFDM symbols.

5. A user equipment for ACKnowledgement/Negative ACKnowledgement (ACK/NACK) reporting of Cat-M mechanism, wherein the user equipment comprises:
a reporting apparatus for feeding back an ACK/NACK message to an evolved Node B (eNB) on Physical Uplink Shared CHannel (PUSCH) based on received downlink data,
wherein when computing the number of resource elements occupied by the ACK/NACK message on PUSCH, the number of Orthogonal Frequency Division Multiplexing (OFDM) symbols in a guard period is ruled out.

6. The user equipment according to claim 5, wherein when computing the number of Single Carrier Frequency Division Multiple Access (SC-FDMA) symbols that carry PUSCH data in an initial PUSCH transmission subframe, the number of OFDM symbols in the guard period is ruled out.

7. The user equipment according to claim 6, wherein the number of SC-FDMA symbols that carry the PUSCH data in the initial PUSCH transmission subframe is denoted as $N_{symb}^{PUSCH\text{-}initial}$, $$N_{symb}^{PUSCH\text{-}initial} = (2 \cdot (N_{symb}^{UL} - 1) - N_{SRS} - N_{start}^{PUSCH} - N_{end}^{PUSCH}),$$

where $N_{symb}^{UL}$ is the number of SC-FDMA symbols in each timeslot,
$N_{SRS}$ is the number of Sounding Reference Signals (SRS) SC-FDMA symbols reserved in the current subframe,
$N_{start}^{PUSCH}$ is the serial number of an initial OFDM symbol for PUSCH transmission, and
$N_{end}^{PUSCH}$ is a minimum value between 0 and a difference, the difference being a difference between the number of OFDM symbols punctured off the end of the current subframe and the number of SRS OFDM symbols.

8. An evolved Node B (eNB) for ACKnowledgement/Negative ACKnowledgement (ACK/NACK) reporting of Cat-M mechanism, wherein the eNB comprises:
a receiving apparatus for receiving, on Physical Uplink Shared CHannel (PUSCH), an ACK/NACK message fed back by a user equipment, the ACK/NACK message corresponding to the downlink data previously transmitted by the eNB to the user equipment,
wherein when computing the number of resource elements occupied by the ACK/NACK message on PUSCH, the number of Orthogonal Frequency Division Multiplexing (OFDM) symbols in a guard period is ruled out.

9. The eNB according to claim 8, wherein when computing the number of Single Carrier Frequency Division Multiple Access (SC-FDMA) symbols that carry PUSCH data in an initial PUSCH transmission subframe, the number of OFDM symbols in the guard period is ruled out.

10. The eNB according to claim 9, wherein the number of SC-FDMA symbols that carry the PUSCH data in the initial PUSCH transmission subframe is denoted as $N_{symb}^{PUSCH\text{-}initial}$, $$N_{symb}^{PUSCH\text{-}initial} = (2 \cdot (N_{symb}^{UL} - 1) - N_{SRS} - N_{start}^{PUSCH} - N_{end}^{PUSCH}),$$

where $N_{symb}^{UL}$ is the number of SC-FDMA symbols in each timeslot,
$N_{SRS}$ is the number of Sounding Reference Signals (SRS) SC-FDMA symbols reserved in the current subframe,
$N_{start}^{PUSCH}$ is the serial number of an initial OFDM symbol for PUSCH transmission, and
$N_{end}^{PUSCH}$ is a minimum value between 0 and a difference, the difference being a difference between the number of OFDM symbols punctured off the end of the current subframe and the number of SRS OFDM symbols.

11. A system for ACKnowledgement/Negative ACKnowledgement (ACK/NACK) reporting of Cat-M mechanism, wherein the system comprises a user equipment and an evolved Node B
wherein the user equipment comprises:
a reporting apparatus for feeding back an ACK/NACK message to the eNB on Physical Uplink Shared CHannel (PUSCH) based on received downlink data,
wherein the eNB comprises:
a receiving apparatus for receiving, on PUSCH, the ACK/NACK message fed back by the user equipment, the ACK/NACK message corresponding to the downlink data previously transmitted by the eNB to the user equipment,
wherein when computing the number of resource elements occupied by the ACK/NACK message on PUSCH, the number of Orthogonal Frequency Division Multiplexing (OFDM) symbols in a guard period is ruled out.

12. The system according to claim 11, wherein the number of Single Carrier Frequency Division Multiple Access (SC-FDMA) symbols that carry the PUSCH data in an initial PUSCH transmission subframe is denoted as $N_{symb}^{PUSCH\text{-}initial}$, $$N_{symb}^{PUSCH\text{-}initial} = (2 \cdot (N_{symb}^{UL} - 1) - N_{SRS} - N_{start}^{PUSCH} - N_{end}^{PUSCH}),$$

where $N_{symb}^{UL}$ is the number of SC-FDMA symbols in each timeslot, $N_{SRS}$ is the number of Sounding Reference Signals (SRS) SC-FDMA symbols reserved in the current subframe, $N_{start}^{PUSCH}$ is the serial number of an initial OFDM symbol for PUSCH transmission, and $N_{end}^{PUSCH}$ is a minimum value between 0 and a difference, the difference being a difference between the number of OFDM symbols punctured off the end of the current subframe and the number of SRS OFDM symbols.

13. The system according to claim 11, wherein when computing the number of SC-FDMA symbols that carry PUSCH data in an initial PUSCH transmission subframe, the number of OFDM symbols in the guard period is ruled out.

* * * * *